C. L. HOFF & M. O. REHFUSS.
CHAIN LINK FORMING MACHINE.
APPLICATION FILED JULY 25, 1911.

1,056,175.

Patented Mar. 18, 1913.
6 SHEETS—SHEET 1.

C. L. HOFF & M. O. REHFUSS.
CHAIN LINK FORMING MACHINE.
APPLICATION FILED JULY 25, 1911.

1,056,175.

Patented Mar. 18, 1913.
6 SHEETS—SHEET 3.

Witnesses
Thomas Durant
Elbert P. Brown

Inventors
Carlton L. Hoff
Martin O. Rehfuss
By Church & Church
their Attorneys

C. L. HOFF & M. O. REHFUSS.
CHAIN LINK FORMING MACHINE.
APPLICATION FILED JULY 25, 1911.

1,056,175.

Patented Mar. 18, 1913.

Witnesses
Thomas Durant
Halbert P. Brown

Inventors
Carlton L. Hoff
Martin O. Rehfuss
By Church & Church
Their Attorneys

C. L. HOFF & M. O. REHFUSS.
CHAIN LINK FORMING MACHINE.
APPLICATION FILED JULY 25, 1911.

1,056,175.

Patented Mar. 18, 1913.

Witnesses

Inventors
Carlton L. Hoff and
Martin O. Rehfuss
By
their Attorneys

C. L. HOFF & M. O. REHFUSS.
CHAIN LINK FORMING MACHINE.
APPLICATION FILED JULY 25, 1911.

1,056,175.

Patented Mar. 18, 1913.

UNITED STATES PATENT OFFICE.

CARLTON L. HOFF, OF YORK, AND MARTIN O. REHFUSS, OF PHILADELPHIA, PENNSYLVANIA.

CHAIN-LINK-FORMING MACHINE.

1,056,175.   Specification of Letters Patent.   Patented Mar. 18, 1913.

Application filed July 25, 1911. Serial No. 640,402.

*To all whom it may concern:*

Be it known that we, CARLTON L. HOFF and MARTIN O. REHFUSS, citizens of the United States, residing, respectively, at York and Philadelphia, in the counties of York and Philadelphia, State of Pennsylvania, have invented certain new and useful Improvements in Chain-Link-Forming Machines; and we do hereby declare the following to be a full, clear, and exact description of the same, reference being had to the accompanying drawings, forming part of this specification, and to the figures and letters of reference marked thereon.

This invention relates to machines for forming chain links as a step preliminary to the uniting and welding of the links into a complete chain.

The objects of the invention are to provide a simple and highly efficient machine adapted to operate at high speed and competent to form links from stock of widely different gage or cross sectional area.

A further object of the invention is to provide a machine adapted to wind the stock into spiral form, sever the spirals and straighten each severed spiral to form an open link adapted to have its ends united by butt welding.

A further object of the invention is to provide a machine which will automatically form accurately dimensioned open links adapted to be welded in electric chain link welding machines of a simple and inexpensive character.

With the above objects in view the invention consists in a link forming machine embodying a winding mechanism, a severing mechanism and an alining mechanism which coöperate in the production of open chain links.

The invention further consists in certain novel details of construction and combinations and arrangements of parts, all as will be now described and pointed out particularly in the appended claims.

In the accompanying drawings.

Similar letters of reference in the several figures indicate the same parts.

In its general construction, the machine of the present invention embodies a winding mandrel upon which the rod or wire is wound in the form of a spiral and from which it is gradually discharged as the winding progresses. The successive coils of the stock are severed from each other by transverse cuts, and as each is severed it is conducted to a pair of dies for spreading the ends and alining the link ready for being assembled and welded in a chain.

The body of the mandrel, indicated by the letter A in the drawings, is journaled in the main frame B and is adapted to be rotated from gear wheel $a$ through a one revolution clutch. The gear wheel $a$ derives its motion from a heavy pinion $a'$ on a shaft with suitable fast and loose pulleys $a^2$, $a^3$ to which a suitable power belt may be applied.

Projecting from the body A of the mandrel is a nose piece or stem A' preferably of a shape in cross section which substantially conforms to the opening in the formed links. As shown, it is of oval shape in cross section, and by the rotation of the mandrel the rod or wire is wound on the stem in the form of a spiral. The wire or rod stock is fed from a reel or other supply not shown, through a guide $c$ and between the stem A' and a winding roller C held in contact with the stem by a relatively strong spring C' adjustably supported at $C^2$. The winding roller is free to rise and fall as the mandrel and stem rotate and serves to force the stock firmly against said stem during the winding operation. As the mandrel rotates, the ends of the oval spirals enter, or receive between them a guide, best seen in Fig. 5, which serves to gradually force the spirals toward the free end of the stem from which they are ultimately discharged. The guide is inclined to the axis of the mandrel and is preferably formed by a wear plate D removably mounted on a bar D' removably supported on studs D² projecting from the head or frame of the machine.

Figure 5:
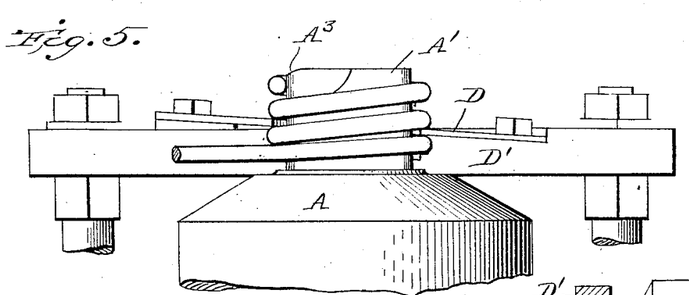
Fig. 5 is a view looking at the under side of the winding mandrel and spiral guide.
Figures 7, 8, 9, 10, 11:
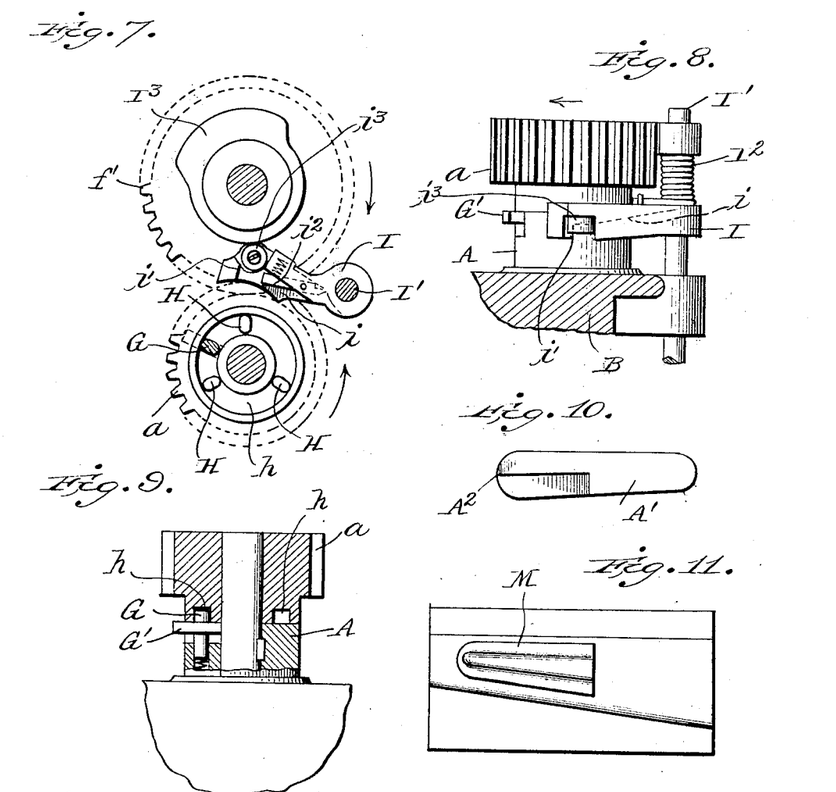
Figs. 7, 8 and 9 are detail views of the one revolution clutch in the driving connections of the winding mandrel.
Fig. 10 is an elevation of the end of the winding mandrel and cutter.
Fig. 11 is a view looking at the end or bottom face of the upper link straightening die.
Figure 12:
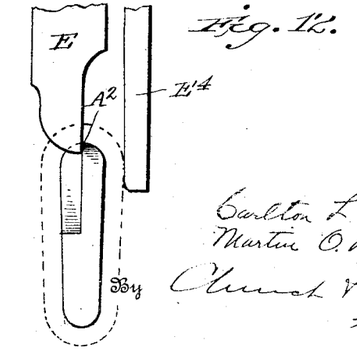
Fig. 12 is a detail of the cutters for severing the spiral into links.
Figure 13:
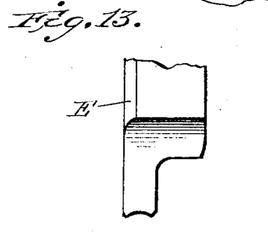
Fig. 13 is an elevation of the upper cutter as viewed from the right hand side in Fig. 12.

As shown in Figs. 5, 10 and 12, the stem A' is cut away on one side near the end to form a cutting edge or jaw A², parallel with the axis of the mandrel, and the one revolution clutch interposed between the gear $a$ and mandrel is for the purpose of causing the mandrel to come to rest and be firmly locked with the cutting jaw in proper position for coöperation with a reciprocatory cutter E carried by a plunger E' (Figs. 3 and 12) and reciprocated by a cam E² on a shaft F. Shaft F carries at its rear end a gear wheel $f$ meshing with a gear wheel $f'$ and the latter in turn meshes with the gear wheel $a$. The gear wheels $f$ and $f'$ are timed to rotate in unison, whereas the wheel $a$, when in motion, travels at a somewhat higher speed so as to allow for the necessary dwell of the mandrel during the cutting operation. As a convenient arrangement the proportions may be for the gear wheels $f$ and $f'$ to have forty-eight teeth and the gear wheel $a$ thirty-six teeth, with the one revolution clutch arranged to permit a dwell of the mandrel equal to one third of the revolution of the gear wheel $a$, thereby bringing the cutter on the mandrel into proper position for coöperation with the reciprocatory cutter once during each revolution of the shaft F.

Obviously, any known or preferred form of clutch which will lock the mandrel when at rest may be employed. The clutch at present employed is illustrated in detail in Figs. 7 to 9 of the drawing and embodies a spring-pressed pin G mounted to slide longitudinally in the rear end of the mandrel, and at its rear end, when projected, to engage any one of three pins or projections H located in an annular channel $h$ in the hub of the gear wheel $a$. Said pins or projections are equally spaced at 120° apart and the dwell of the mandrel equals the space between adjacent pins or compensates for the difference in the speed of movement of the wheels $a$ and $f$ with the result that the mandrel and shaft F rotate in the same time.

The clutch pin G is provided with a transverse projection G' projecting from the periphery of the rear end of the mandrel, adapted to coöperate with a locking and releasing arm I to first disengage the clutch pin and lock the mandrel, and after the cutters have operated, to release the pin for again putting the mandrel in motion. The arm I is journaled on a shaft I' normally held retracted or up out of operative position by a spring I². On one side it is provided with an inclined face $i$ (dotted lines, Fig. 8) for retracting the pin G and a stop or lock shoulder $i'$ against which the projection on the pin comes to rest when the pin is retracted to arrest further rotation of the mandrel. To prevent rebound or reverse movement of the mandrel, a spring-pressed latch $i^2$ is pivoted in the arm I in position to spring in behind the projection G' at the instant when the projection engages the shoulder $i'$. While the arm I is normally held elevated by its spring, it is brought down into position to engage the projection on the pin, by a cam I³ rotating in unison with the shaft F, and preferably mounted as shown on the shaft or hub of the gear wheel $f'$. This cam bears on an antifriction roller $i^3$ on the arm I and is so proportioned that the arm will be held depressed only until the cutting operation is completed and the movable cutter retracts, or during approximately one third of the revolution of the wheel $f'$. The movable clutch pin is thus disengaged from one of the pins or projections H and is invariably released to engage the next succeeding pin H, thereby preserving the proper rotative movement of the mandrel with relation to the reciprocations of the cutter E.

As each spiral is severed by the cutters it is forced down and off the end of the mandrel stem and to facilitate this, the end of the stem is rounded slightly as at A³ (see Fig. 5), and at the lower end the spiral passes outside of the upwardly projecting edge $k$ of a chute K by which the severed spiral is conducted down to the alining and end spreading dies.

Figure 1:
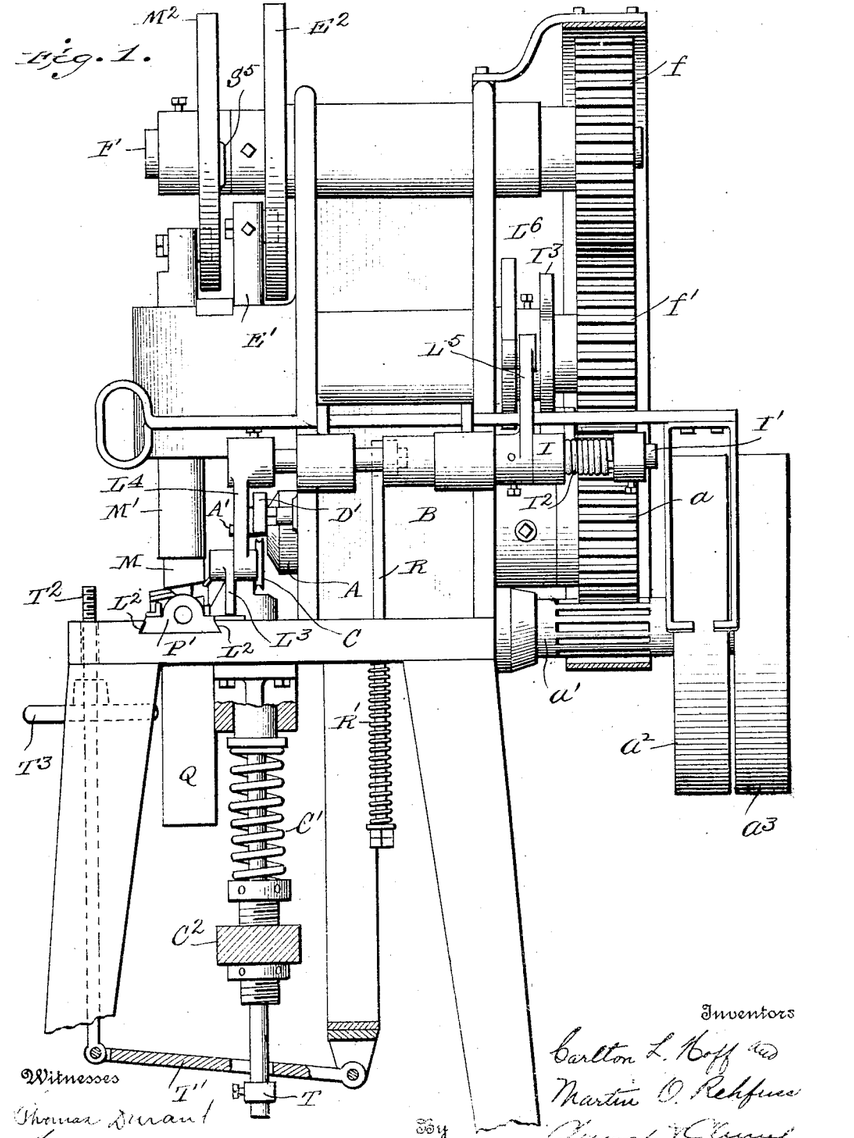
—Figure 1 is a side elevation of a machine embodying the present improvements, a portion of the frame being broken away.
Figure 14:
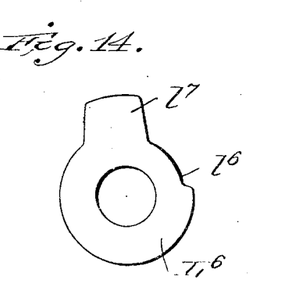
Fig. 14 is a face view of the cam for operating the bottom die.

To hold the spirals up to the cutting point during the cutting operation a spiral support E⁴ is mounted on the cutter plunger, parallel with and projecting beyond the end of the cutter E. This support passes down outside of the spiral remaining on the mandrel after the cut and holds the same firmly up against the mandrel at the time when the cut is being made, as will be readily understood by reference to Fig. 12. When the severed spirals drop into the chute K they may be retained therein temporarily by mechanism which will be presently described, but ordinarily they are permitted to pass down through the chute directly into the alining and end spreading dies located in front of and slightly below the end of the winding mandrel. The said dies consist primarily of a lower die L shown in plan separate from the machine in Fig. 15, and an upper reciprocatory die M shown in end elevation in Fig. 11. The reciprocatory die M is mounted on the lower end of a plunger M', Figs. 1 and 2, guided vertically in the main frame of the machine and adapted to be operated by a cam $M^2$ mounted on the shaft F, preferably at a point in front of the cam $E^2$, before referred to. The lower die L is mounted on a carriage L' adapted to slide transversely in guideways $L^2$ in the main frame and to be periodically moved by a link $L^3$ jointed to the lower end of a rock arm $L^4$ on the forward end of the shaft I', journaled in horizontal position in bearings on the main frame, and at its rear end and immediately in front of the arm I, provided with a crank arm $L^5$ having a roller upon its end adapted to bear on a peripheral cam $L^6$ mounted on the shaft or hub of the gear wheel $f'$. The conformation of the cam $L^6$ is such as to impart to the carriage and lower die first a slight movement toward the right in Figs. 1, 4 and 16, whereby the carriage and die will be moved to the position indicated in Fig. 17, and then a relatively long movement toward the left, whereby the die and carriage will be moved to the position indicated in Fig. 18. To secure these movements, the cam $L^6$ is provided with a depressed concentric portion $l^6$ (Fig. 14) for giving the slight movement toward the right and a relatively abrupt projecting portion $l^7$, for giving the long movement toward the left.

Figure 6:
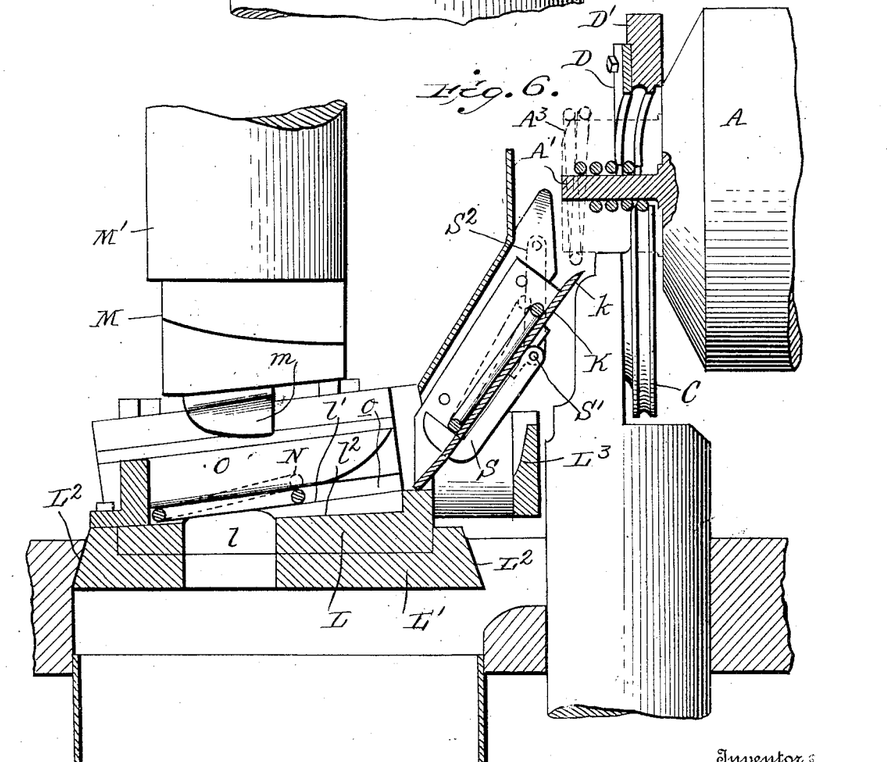
Fig. 6 is a sectional elevation on an enlarged scale, showing the winding mandrel, winding roller and link straightening dies.
Figure 15:
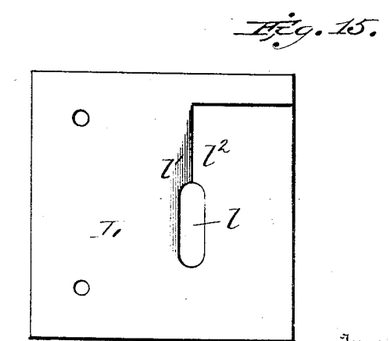
Fig. 15 is a plan view of the bottom die alone.
Figure 16:
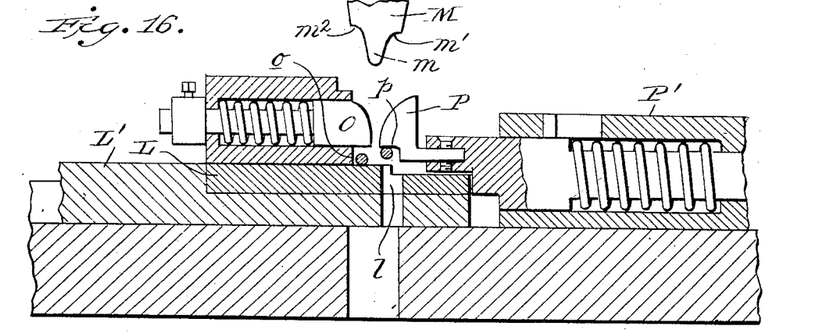
Figs. 16, 17 and 18 are diagrammatic sections showing the action of the dies in alining and discharging a link.
Figure 17:
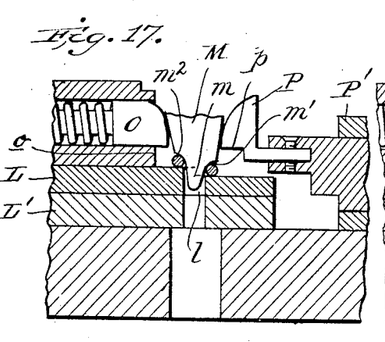
Figure 18:
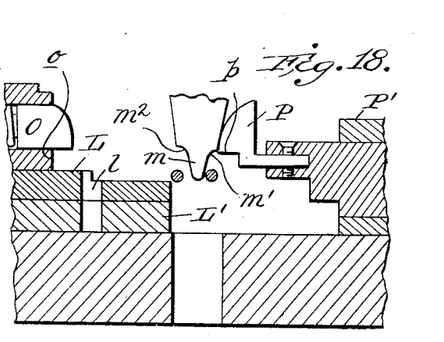

The lower die L is provided with a central recess or aperture $l$, the wall on one side $l'$ of said aperture being somewhat thicker or higher than on the opposite side $l^2$, as will be readily understood by reference to Figs. 6 and 15, and the link in traveling down into position to be operated upon by the dies is caused to position itself in such manner that the lower free end of the spiral will rest on the more elevated side $l'$ of the lower die, and the other arm of the spiral, which then occupies the position indicated in dotted lines at N in Fig. 6, will be depressed or bent down into contact with the lower wall $l^2$ by the action of the upper die, thus setting the metal sufficiently to cause the two arms or ends of the spiral to stand opposite each other when the spiral is released from between the dies. In order to avoid any likelihood of the link catching or lodging in the opening $l$, the lower die normally, or at the time when the link is received on the same, occupies a position slightly out of line with the line of travel of the link, as indicated, for instance, in Fig. 16 of the drawing. Before the upper die descends, however, the lower die moves over to the position indicated in Fig. 17. with the opening $l$ directly beneath the upper die and in position to receive the link spreading and positioning nose $m$ of said upper die. The transverse configuration of the nose piece $m$ of the upper die, it will be noted from Figs. 16, 17 and 18, is substantially wedge-shaped, but the overhanging wall $m'$ on one side is somewhat lower than the wall $m^2$ on the opposite side, in order to force the high side of the spiral down, as heretofore described.

Figures 3, 4:
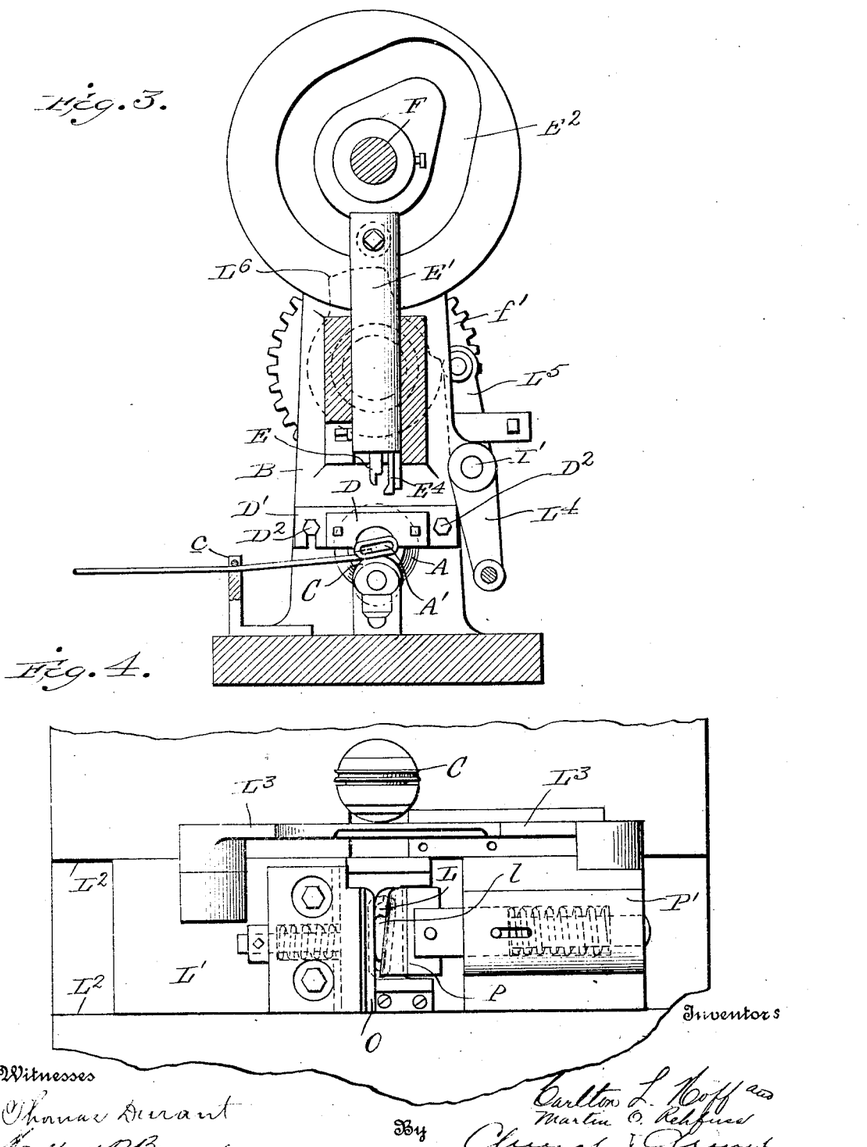
Fig. 3 is a sectional elevation in a transverse plane in front of the cutter and its operating cam.
Fig. 4 is a detail plan view of the link guides, bottom straightening die and winding roller.

For the purpose of positioning the link, as it travels down beneath the dies, a spring-pressed plunger O is mounted on the carriage L' over the die L and in position to project slightly beyond a fixed wall $o$, thereby constituting a channel or raceway which is flared upwardly at its entering end as shown in Fig. 6. On the opposite side of the opening $l$ in the die L, there is mounted a spring-pressed plunger or guide P having an undercut at $p$ forming the opposite side of the raceway into which the link travels between the dies, said spring-pressed plunger P being conveniently mounted on a stem working in a housing P' carried by the main frame, as best seen in Fig. 4. The proximate faces of the plungers O and P are rounded, and said plungers are adapted to be forced back against the tension of their springs by the descent of the upper die M, as will be readily understood from an inspection of Figs. 16 to 18, but in forcing said plungers outwardly, the nose of the die M enters the spiral, thereby completing its positioning over the opening $l$ in the lower die, and the final downward movement of the upper plunger serves not only to aline the spiral, but to spread the ends of the same so as to form a link open at one end and ready for being closed and butt-welded in a simple type of electric chain link welding machine. After the spiral has been thus alined and its ends spread, the upper die withdraws a short distance, due to the action of the portion $m^2$ of the cam $M^2$, or until it occupies a vertical position substantially as indicated in Fig. 18, and while it dwells for a brief movement in this position, the projection $l^7$ on the cam $L^6$ is operative to move the carriage L' and die L toward the left, as indicated in Fig. 18. As a result the alined spiral or link will be discharged by the withdrawal of the supporting die and carriage from beneath it, and it will drop down through a discharge spout Q into any suitable receptacle beneath the machine.

For the purpose of holding the carriage in its normal position, with the arm $L^5$ against the cam $L^6$ the shaft I' may conveniently be provided with a crank arm and link connection R extending down through the bed of the main frame, and having on its lower end a coil spring R', which spring is compressed and by its resiliency serves to hold the carriage and shaft in proper position.

Figure 2:
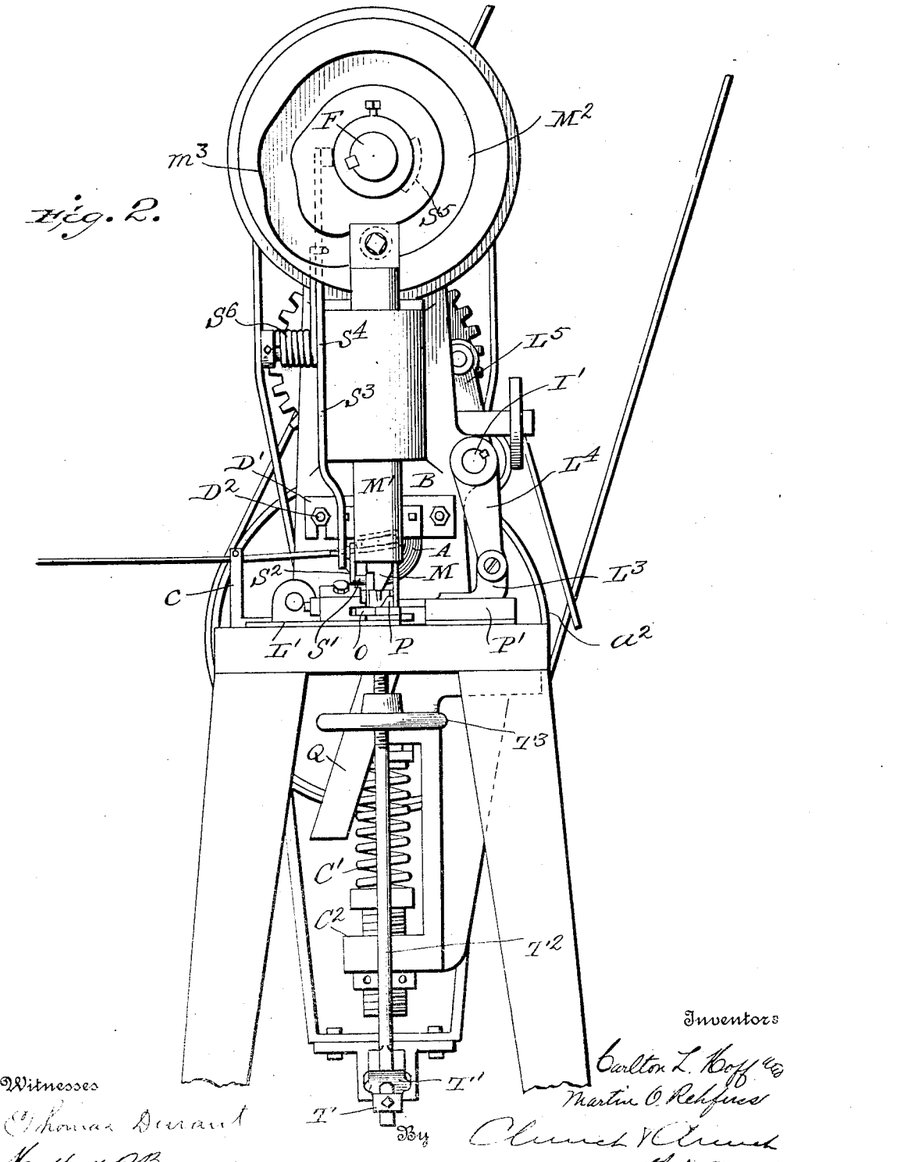
Fig. 2 is a front elevation of the same.

Should it be desired to operate the machine in such manner that a link is severed from the spiral on the mandrel at a time when another link is being alined and its ends spread, a feeding device may be arranged in the chute K, as shown in Figs. 2 and 6. This feeding device embodies a hook-like support S adapted to project through the bottom of the chute and to arrest a link or severed spiral in the position indicated in Fig. 6. The support S is mounted on a shaft S' extending out to one side of the chute and provided with a crank arm S² extending upwardly into position to coöperate with the lower end of a lever S³ pivoted on the head of the machine at S⁴, and at its upper end adapted to coöperate with a projection S⁵ (Fig. 1) on the rear face of the cam M². The lever is held pressed in one direction by a spring S⁶, and when struck by the cam projection S⁵ operates to swing the arms S and S², withdrawing the hook ends of the arm S from below the link and allowing the latter to pass down between the dies. Obviously, the projection or cam S⁵ may be positioned to effect the release of the severed spiral or link at the moment when the dies are ready for its reception, and therefore the timing of the operations of severing and alining and spreading the severed spirals or links, need not be so accurately determined or set.

For the purpose of relieving pressure on the winding roller, should it be desired to do so for any purpose, such, for instance, as when the end of a new length of stock is to be inserted, the lower end of the roller supporting standard, which passes down through the spring and adjustable support, may be provided with a head or collar T with which a lever T' coöperates, said lever being connected with a threaded rod T² having a hand wheel T³ thereon adapted to bear up against the bed of the frame so as to force the lever T' downwardly and thereby withdraw the winding roller from the mandrel, as aforesaid.

Having thus described our invention, what we claim as new and desire to secure by Letters Patent of the United States, is:

1. In a link forming machine, the combination with a rotary winding mandrel having a cutting jaw thereon and a coöperating reciprocatory cutter, of a drive gearing for the reciprocatory cutter and mandrel embodying a one revolution clutch in the mandrel connections whereby the mandrel is held in fixed position during the operation of the cutting jaws.

2. In a link forming machine, the combination with a rotary winding mandrel having a cutting jaw in proximity to its free end and a reciprocatory cutter for coöperating therewith, of a driving mechanism for the reciprocatory cutter and mandrel embodying means for periodically arresting the movement of and locking the mandrel with the cutting jaw in position to coöperate with the reciprocatory cutter.

3. In a link forming machine, the combination with a rotary winding mandrel having a cutting jaw in proximity to its free end and a reciprocatory cutter for coöperating therewith, of driving mechanism intermediate the mandrel and cutter whereby the mandrel is rotated and the cutter reciprocated in equal time and embodying means whereby the mandrel is moved intermittently, and means for holding the mandrel in fixed position during the cutting operation.

4. In a link forming machine, a rotary winding mandrel having a cutting jaw formed thereon in proximity to its free end, and means for guiding a rod to said mandrel to form a spiral embodying a winding roller movable independently of the mandrel, of a coöperating cutter for severing the spiral into links and discharging the same from the mandrel.

5. In a link forming machine, a rotary winding mandrel of oval shape in cross section and having a cutting jaw on one edge in proximity to the free end, and a guide inclined to the axis of the mandrel consisting of a wear plate removably mounted on the frame for advancing the spiral toward the end of the mandrel, of a cutter coöperating with the cutting jaw on the mandrel for severing the spiral into links.

6. In a link forming machine the combination with a winding mandrel of oval shape in cross section and having a cutting jaw at one edge in proximity to the free end, of a guide comprising a wear plate removably mounted on the frame inclined to the axis of the mandrel for discharging the formed spiral, a reciprocatory cutter coöperating with the cutting jaw on the mandrel to sever the spiral into links, and means for holding the mandrel stationary during the cutting operation.

7. In a link forming machine, the combination with a winding mandrel and a spring-pressed roller coöperating therewith to form a spiral, of a guide inclined to the axis of the mandrel for discharging the formed spiral therefrom, and intermittently acting cutting jaws for severing the spiral into links, one jaw vertically reciprocating the other integral with the winding mandrel, with means whereby said cutting jaws are operated once in each rotation of the mandrel.

8. In a link forming machine, the combination with a winding mandrel and means for severing the successive convolutions of the spiral formed on said mandrel, of straightening dies to which the severed sections of the spiral are delivered, and means for intermittently operating said dies to bend the arms of the links in substantially the same plane, aline the severed sections and form the open links.

9. In a link forming machine the combination with a winding mandrel having a cutting edge thereon and a reciprocatory cutting jaw for severing the spiral formed on the mandrel into sections of a die for bringing the sides of the link into the same plane and a die for spreading the link at one end, and means for transferring the severed link from the mandrel into operative position with respect to said dies.

10. In a link forming machine the combination with a winding mandrel, means for intermittently operating said mandrel and intermittently operated cutting jaws for severing the spiral into sections, one of said jaws integral with the mandrel, the other reciprocatory vertically, of intermittently operating dies for bending the sides of the links into substantially the same plane and means for delivering the link sections from the mandrel into operative position with respect to said dies and means for discharging the flattened links from said dies.

11. In a link forming machine, the combination with a spiral winding and severing mechanism, of alining dies to which the severed sections of the spiral are delivered, embodying a bottom die having an elevated and a depressed face for supporting opposite arms of the section of the spiral.

12. In a link forming machine, the combination with a spiral winding and severing mechanism, of alining dies to which the severed sections of the spiral are delivered, embodying a bottom die having an elevated and a depressed link engaging surface for supporting opposite arms of the link, an upper die for coöperating therewith, and means for reciprocating said dies in planes substantially at right angles to each other.

13. In a link forming machine, the combination with a spiral winding and severing mechanism, of link alining dies movable in planes substantially at right angles to each other, and a chute for conducting the severed sections of the spiral to said dies.

14. In a link forming machine, the combination with a spiral winding and severing mechanism, a chute to which the severed sections of the spiral are delivered, a die to which said sections are delivered by the chute, said die embodying a link forming surface, spring-pressed plungers, and a coöperating reciprocatory die movable between said plungers into engagement with the link.

15. In a link forming machine, the combination with a spiral winding and severing mechanism and a chute to which the severed sections of the spiral are delivered, of a die to which the severed sections are delivered by the chute, means for moving said die transversely, a vertically reciprocatory die for coöperating with said first mentioned die, and means whereby said first mentioned die is moved transversely while the link is in engagement with the vertically movable die for discharging the link.

16. In a link forming machine, the combination with a spiral winding and severing mechanism, of alining and end spreading mechanism to which the severed sections of the spiral are delivered, embodying a bottom die having elevated and depressed link end engaging surfaces, an upper die having elevated and depressed link engaging surfaces, means for reciprocating the upper die vertically, and means for reciprocating the bottom die transversely to position and discharge the link.

17. In a link forming machine, the combination with spiral winding and severing mechanism, of link alining mechanism to which the severed sections of the spiral are delivered, embodying a bottom die, spring-pressed plungers overlying said bottom die to form a raceway for the link, and a reciprocatory upper die having converging walls for coöperation with said plungers to move the same outwardly during the straightening of the link.

18. In a link forming machine, the combination with a rotary mandrel, a winding roller and guide coöperating therewith to form a spiral, and a spiral severing jaw on the mandrel, of a reciprocatory cutter coöperating with the jaw on the mandrel, a shaft and cam for reciprocating said cutter and a driving gearing for said mandrel and shaft embodying gear wheels and a one revolution clutch interposed between said gear wheels and mandrel whereby the mandrel may be arrested in its movement during a portion of the rotation of the shaft.

19. In a link forming machine, the combination with the rotary mandrel, winding roller and guide coöperating therewith to form a spiral thereon, and cutting jaw on said mandrel, of a reciprocatory cutter coöperating with the cutting jaw on the mandrel to sever the spiral into sections, a shaft and cam for reciprocating said cutter, intermeshed gear wheels intermediate the mandrel and cutter shaft for imparting to the mandrel a relatively higher speed than the shaft, and means interposed between the mandrel and gear wheels whereby the movement of the mandrel may be arrested during a portion of each rotation of the shaft, and said shaft and mandrel will rotate in the same time.

20. In a link forming machine, the combination with a winding mandrel having a cutting jaw thereon and a reciprocatory cutter coöperating with said cutting jaw, of a driving gearing for the reciprocatory cutter and mandrel, a lock for holding the mandrel in fixed position during the cutting operation, and a cam movable in unison with the drive gear for the reciprocatory cutter for controlling said lock, whereby the mandrel will invariably be held in fixed position during the operation of the cutter.

21. In a link forming machine, the combination with a winding mandrel, cutter for severing the spiral wound on the mandrel into sections, and alining dies for forming the severed sections of the spiral into links, of a chute for conducting the severed sections from the mandrel to the die, a feeding mechanism interposed in said chute for supporting the severed sections, while the dies are in operation, and means controlled by the die actuating mechanism for operating said feeding mechanism to release the severed sections when the dies are open.

22. In a link forming machine, the combination with a winding mandrel having a cutting jaw thereon in proximity to its free end, of a reciprocatory cutter for coöperating with the jaw on the mandrel and a support movable in unison with said reciprocatory cutter for supporting the end of the spiral during the cutting operation.

23. In a link forming machine, the combination with a winding mandrel having a cutting jaw thereon in proximity to its free end, a winding roller coöperating with the mandrel to form a spiral thereon, and an inclined guide with which the spiral coöperates and whereby it is discharged from the mandrel, of a coöperating cutter movable toward and from the mandrel to sever the spiral into sections, and a support movable with said cutter and spaced therefrom for the admission of a section of the spiral between the cutter and support during the cutting operation.

CARLTON L. HOFF.
MARTIN O. REHFUSS.

Witnesses:
HARRY M. McBURNEY,
JAS. ZIEGLER.